(12) United States Patent
James

(10) Patent No.: US 7,484,302 B2
(45) Date of Patent: Feb. 3, 2009

(54) CREDIT CARD-SHAPED TIRE TREAD GAUGE

(76) Inventor: Robert McCaig James, 814 Moffatt Cir., Simi Valley, CA (US) 93065

( * ) Notice: Subject to any disclaimer, the term of this patent is extended or adjusted under 35 U.S.C. 154(b) by 154 days.

(21) Appl. No.: 11/333,395

(22) Filed: Jan. 17, 2006

(65) Prior Publication Data

US 2006/0156570 A1 Jul. 20, 2006

Related U.S. Application Data

(60) Provisional application No. 60/644,698, filed on Jan. 18, 2005.

(51) Int. Cl.
G01B 5/18 (2006.01)
(52) U.S. Cl. .............. 33/203.11; 33/571; 33/679.1; 33/836
(58) Field of Classification Search ............. 33/203.11, 33/203, 542, 836, 494, 571, 679.1
See application file for complete search history.

(56) References Cited

U.S. PATENT DOCUMENTS

| | | | | |
|---|---|---|---|---|
| 1,601,407 A * | 9/1926 | Murray | ............... | 33/542 |
| 1,637,775 A * | 8/1927 | Keaton | ............... | 33/203.11 |
| 2,229,124 A * | 1/1941 | Phillips | ............... | 33/542 |
| 2,687,574 A * | 8/1954 | Heal | ............... | 33/501 |
| 3,063,154 A * | 11/1962 | Slavsky | ............... | 33/542 |
| 3,170,243 A * | 2/1965 | Williams | ............... | 33/836 |
| 3,269,019 A * | 8/1966 | Krohn | ............... | 33/203.11 |
| 5,079,846 A * | 1/1992 | Iden | ............... | 33/364 |
| 5,246,375 A * | 9/1993 | Goede | ............... | 33/1 SP |
| 2003/0051362 A1 * | 3/2003 | Buckman et al. | ............... | 33/566 |

* cited by examiner

*Primary Examiner*—G. Bradley Bennett
(74) *Attorney, Agent, or Firm*—Erickson, Kernell, Derusseau & Kleypas, LLC

(57) ABSTRACT

A tire tread gauge shaped like a rectangular card that fits easily into a credit card slot in a wallet or purse. The card has a tread measurement scale imprinted, engraved, molded or otherwise marked onto one or both sides and is used to measure the remaining tread depth on motor vehicle tires. Other possible embodiments include a card with more or less than 4 sides or a round card.

10 Claims, 2 Drawing Sheets

Attachment A

Attachment A

Attachment B

CREDIT CARD-SHAPED TIRE TREAD GAUGE

CROSS-REFERENCE TO RELATED APPLICATIONS

This patent claims the benefit of provisional patent application Ser. No. 60/644,698, filed on Jan. 18, 2005 by the present inventor.

BACKGROUND OF THE INVENTION

1. Field of Invention

This invention relates to tire tread depth gauges used to measure tread depth on motor vehicle tires.

2. Background of the Invention

This invention pertains to devices, commonly referred to as tire tread gauges, that are used to measure the remaining tread on tires used on motor vehicles.

Many automobile accidents occur every day in the United States. A significant number of these are caused by tires that have insufficient tread left on them to allow the drivers to retain control of their vehicles while driving, stopping or cornering, especially on wet pavement. Most of these accidents could be prevented if drivers would regularly check the remaining tread on their tires and determine if sufficient tread was present to allow safe operation of their vehicles.

Previously existing gauges have generally been composed of two elements, a static housing and a slide-able rod or bar. One of the two elements is marked with a graduated scale and the other is marked with a single mark that aligns with the zero/starting point on the graduated scale when there is no remaining tread on the tire. To use, the static housing is placed against the outside/top edge of the tire tread and the slide-able element is inserted into a groove in the tire tread. This causes the graduated scale to move relative to the single mark (or vice versa) with the resulting position of one relative to the other indicating the remaining tread depth.

The problem is that these tire tread depth gauges have not been of a size and shape that people want to carry on a consistent basis and are therefore not readily available to regularly check for safe tread depth.

SUMMARY OF THE INVENTION

It is therefore the primary object of the present invention to provide a tire tread gauge that is easy to carry by both men and women and that will therefore encourage a greater regularity of use.

This object is accomplished by means of a rectangular card, sized to easily fit in a credit card slot in a wallet or purse. On one side, or both sides, of the card is a tire tread measurement scale positioned so that the beginning point on the scale is aligned with the edge of the card.

The card is then inserted into a groove in the tire tread so that the beginning point of the scale/edge of the card is at the bottom of the groove. A straight object, such as a fingernail, can then be placed on top of the tire tread, perpendicular to the card and parallel to the plane comprising the top of the tire tread and brought into contact with the measurement scale on the card.

The card is then removed holding the straight object in place. The measurement scale can then be observed to see where the straight object came into contact with it. That contact point on the scale shows the depth of the remaining tire tread.

DETAILED DESCRIPTION OF THE PREFERRED EMBODIMENT

Figure 1:
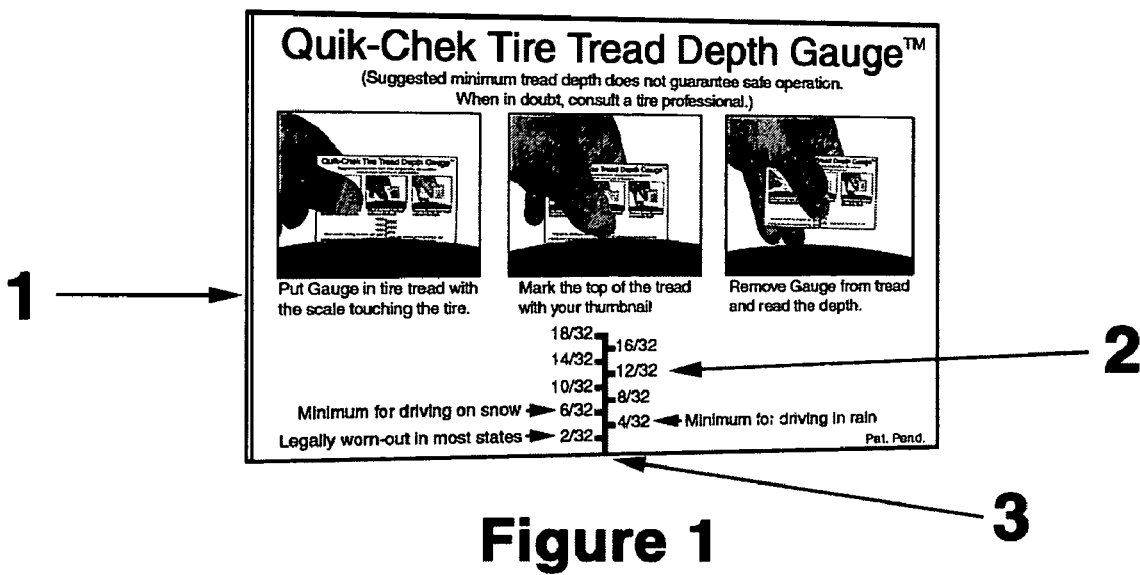
FIG. 1 on Attachment A is a perspective view of the card-shaped tire tread gauge.
Figure 2:
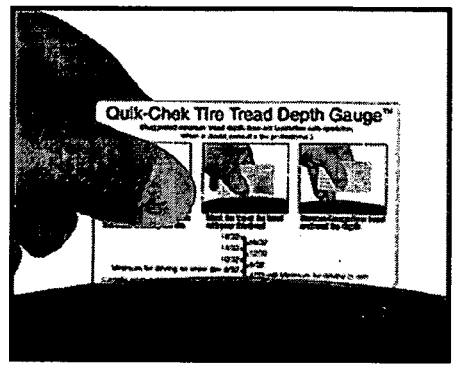
FIG. 2 on Attachment B shows the card inserted into the groove in the tread on a tire FIG. 3 on Attachment B shows the straight edge/thumbnail marking the top of the tread FIG. 4 on Attachment B shows the card being withdrawn with the straight-edge/thumbnail in place on the measurement scale indicating the depth of the remaining tread
Figure 3:
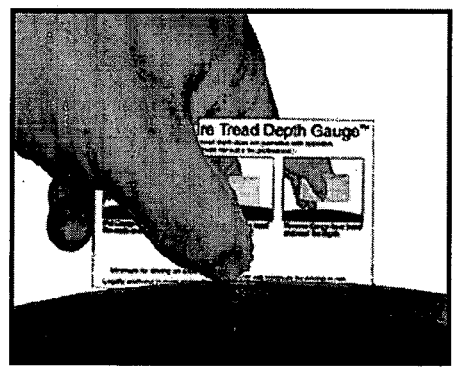
Figure 4:

The design consists of the following features that are shown in FIG. 1 on Attachment A.

1 shows the card-shaped tire tread gauge in perspective.

2 shows the tire tread depth scale.

3 shows the tire tread depth scale aligned with an edge of the card.

It is to be understood that while a certain form of this invention has been illustrated and described, it is not limited thereto except insofar as such limitations are included in the following claims and allowable equivalents thereof.

Having thus described the invention, what is claimed as new and desired to be secured by Letters Patent is as follows:

1. A tire tread depth gauge comprising:
   a card-shaped element adapted to fit in a credit card carrier; and
   a tread depth measurement member for determining remaining tread depth of any used automotive tire, formed on a first face of said card-shaped element and having a beginning point at an edge of said card-shaped element; and
   a scale indicating the remaining tire tread depth and either a minimum tread depth for driving on snow, a minimum tread depth for driving in rain or the tread depth at which a tire is worn-out.

2. A tire tread depth gauge as claimed in claim 1 wherein said card-shaped element is substantially rectangular.

3. A tire tread depth gauge as claimed in claim 1 wherein said card-shaped element has a rounded corner.

4. A tire tread depth gauge as claimed in claim 1 wherein said tread depth measurement member extends upwardly from said edge of said card-shaped element.

5. A tire tread depth gauge as claimed in claim 1 wherein said scale includes depth indicia on said card-shaped element.

6. A tire tread depth gauge as claimed in claim 1 wherein said scale indicates each of said tread depths.

7. A tire tread depth gauge as claimed in claim 4 wherein said tread measurement member extends perpendicularly upwardly from said edge.

8. A tire tread depth gauge as claimed in claim 7 wherein said tread measurement member extends from a mid-point of said edge.

9. A tire tread depth gauge comprising:

a rectangular card adapted to fit in a credit card carrier presenting a top edge, a bottom insertion edge opposite said top edge, opposed side edges and a tread depth gauge surface therebetween, said top and bottom edges having a length greater than said side edges;

a tread depth measurement member for determining remaining tread depth of any used automotive tire, formed on said gauge face, said member extending perpendicularly upwardly from said insertion edge; and a scale indicating the remaining tire tread depth and a minimum tread depth for driving on snow, a minimum tread depth for driving in rain and the tread depth at which a tire is worn-out.

10. A tire tread depth gauge wherein said tread depth measurement member extends from a mid-point of said insertion edge.

* * * * *